United States Patent [19]
Lans et al.

[11] Patent Number: 4,717,928
[45] Date of Patent: Jan. 5, 1988

[54] ARRANGEMENT FOR PRODUCING A PATTERN ON A LIGHT-SENSITIVE SURFACE

[75] Inventors: Hakan Lans, Saltsjöbaden, Sweden; Jean Cano, Geneva, Switzerland

[73] Assignee: Inrad S.A, Geneva, Switzerland

[21] Appl. No.: 893,325

[22] PCT Filed: Sep. 10, 1985

[86] PCT No.: PCT/SE85/00336
§ 371 Date: Jul. 10, 1986
§ 102(e) Date: Jul. 10, 1986

[87] PCT Pub. No.: WO86/01921
PCT Pub. Date: Mar. 27, 1986

[30] Foreign Application Priority Data
Sep. 10, 1984 [SE] Sweden .................. 8404515

[51] Int. Cl.$^4$ ............................ G01D 15/10
[52] U.S. Cl. ........................ 346/160; 350/6.7
[58] Field of Search .......... 346/160, 107 R, 108; 250/268; 350/6.7, 6.8, 6.91

[56] References Cited
U.S. PATENT DOCUMENTS
3,771,350 11/1973 Romans ............... 250/268
4,578,331 3/1986 Ikeda et al. ........... 346/160
4,612,555 9/1986 Hongon et al. ......... 346/160

FOREIGN PATENT DOCUMENTS
0064342 4/1982 European Pat. Off. .......... 250/268

Primary Examiner—Arthur G. Evans

[57] ABSTRACT

An arrangement for producing a pattern on a light-sensitive surface by means of a spot of light (16) capable of being moved over the surface. The spot of light is generated by means of a beam of light emitted by a lighting unit, which is directed at the light-sensitive surface and is caused to strike the surface intermittently in the form of flashes of light. This takes place whilst the beam of light is moved over the surface in accordance with specific instructions from a control unit. The pattern is made up of lines running not only in a selected reference direction, but also at right-angles to the selected reference direction, and also at at least one further fixed angle to the reference direction. The lighting unit contains an aperture by means of which the width of the line can be set. The aperture produces the spot of light (16) on the light-sensitive surface in the form of an isogonal polygon having at least six sides, with a first pair of sides (17, 21) lying opposite one another and essentially parallel to one another. A second pair of sides (19, 23) lie opposite one another, are essentially parallel to one another and are essentially perpendicular to the first-mentioned pair. At least a third pair of sides (18, 20, 22, 24) lie opposite one another, are parallel to one another and lie at an angle to the first-mentioned pair of sides at the aforementioned fixed angle. The beam of light moves for each flash of light over a certain distance which is not more than the length of those sides which extend in the direction of movement.

4 Claims, 8 Drawing Figures

ARRANGEMENT FOR PRODUCING A PATTERN ON A LIGHT-SENSITIVE SURFACE

TECHNICAL FIELD

The present invention relates to an arrangement for producing a pattern on a light-sensitive surface by means of a beam of light capable of being moved over the surface.

BACKGROUND

Arrangements of the kind indicated above are usually in the form of so-called photo-plotters, which have involved considerable investments until now. Photo-plotters are so arranged as a general rule as to be capable of being connected to CAD systems, of which various designs have been introduced onto the market at relatively low prices.

Technical Problem

One problem which is encounterd in this context, however, is the ability to achieve a sufficiently low cost for the photo-plotter in relation to the price of the more simple CAD equipment, but without jeopardizing its viability.

The solution

The problem faced by the invention is solved by the arrangement, in which the spot of light is generated by means of a beam of light emitted from a lighting unit, which is directed at the light-sensitive surface and is caused to strike the surface intermittently in the form of flashes of light as the beam of light is moved over the surface in accordance with specific instructions from a control unit, for which purpose the pattern is made up of lines running not only in a selected reference direction, but also at right-angles to the selected reference direction, and also at at least one further fixed angle to the reference direction, in conjunction with which the lighting unit contains an aperture by means of which certain dimensions of the pattern, such as the width of the aforementioned line, are set, and characterized in that the aperture is so arranged as to produce the aforementioned spot of light on the light-sensitive surface in the form of an isogonal polygon having at least six sides and with a first pair of sides which lie opposite one another and are essentially parallel to one another, and a second pair of sides which lie opposite one another, are essentially parallel to one another and are essentially perpendicular to the first-mentioned pair, and at least a third pair of sides which lie opposite one another, are parallel to one another and lie at an angle to the first-mentioned pair of sides at the aforementioned fixed angle, in conjunction with which the beam of light is so arranged as to move for each flash of light over a distance which is not more than the length of those sides which extend in the direction of movement.

Advantages

The present invention provides an arrangement which satisfies the stringent requirements in respect of reliability and precision and which, at the same time, can be made available at a price which is in line with the prices of the more simple CAD systems.

BRIEF DESCRIPTION OF THE DRAWINGS

The invention is described below in greater detail as an illustrative embodiment with reference to the accompanying drawings, of which

BEST MODE OF CARRYING OUT THE INVENTION

The arrangement according to the invention, i.e. the photo-plotter, is essentially constructed on a rigid frame 1 made of a metal such as cast iron, for example, in order to provide good dimensional stability and the ability to remain unaffected by fluctuations in temperature. The frame 1 supports a table 2 with a flat surface for the material which is to be provided with a pattern in accordance with the invention. The material may be in the form of a light-sensitive film 15, to which the desired pattern is applied by means of exposures. The light-sensitive film may be held in position in many different ways, for instance by means of a vacuum in the form of a number of small holes in the surface of the table 2, by means of which the film is held securely against the surface through the effect of the suction in the holes.

Figure 1:
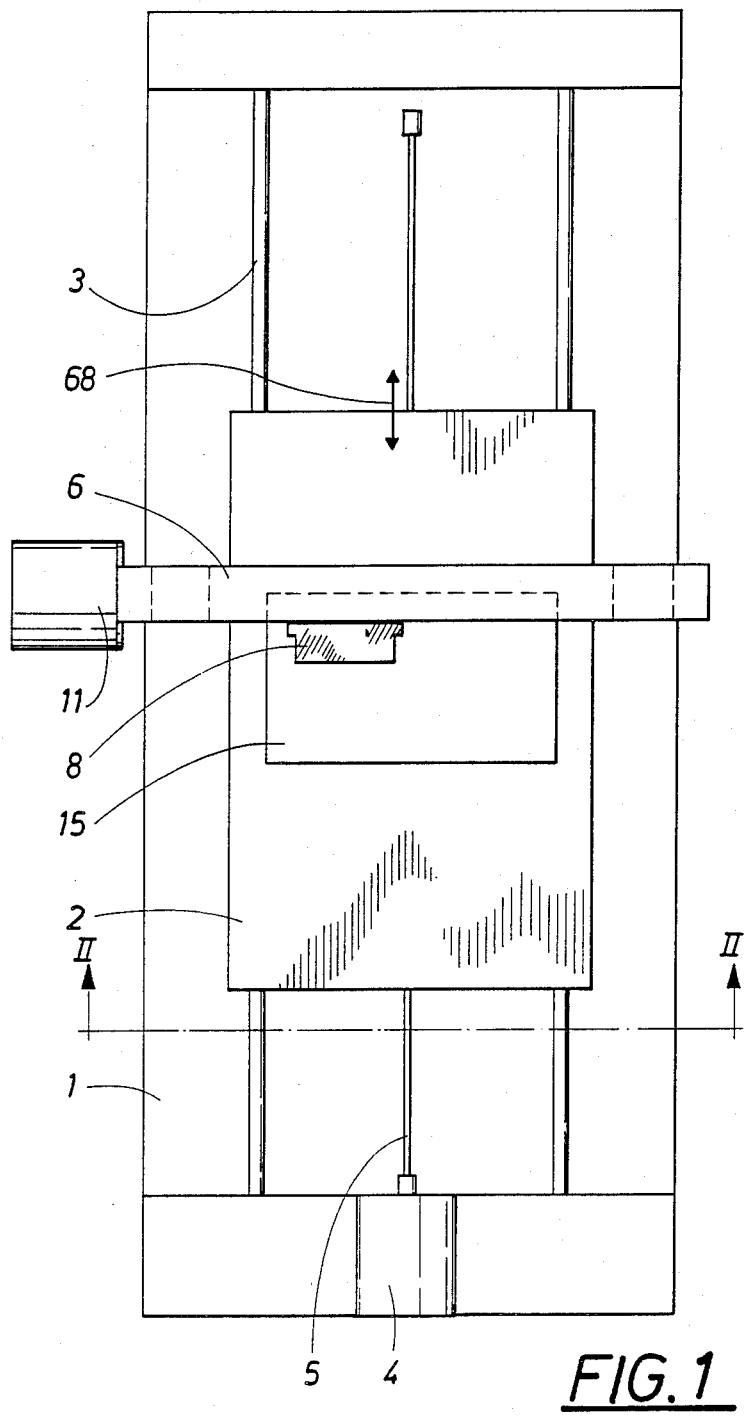
FIG. 1 shows a plan view of an arrangement according to the invention, referred to below as a photo-plotter.
Figure 2:
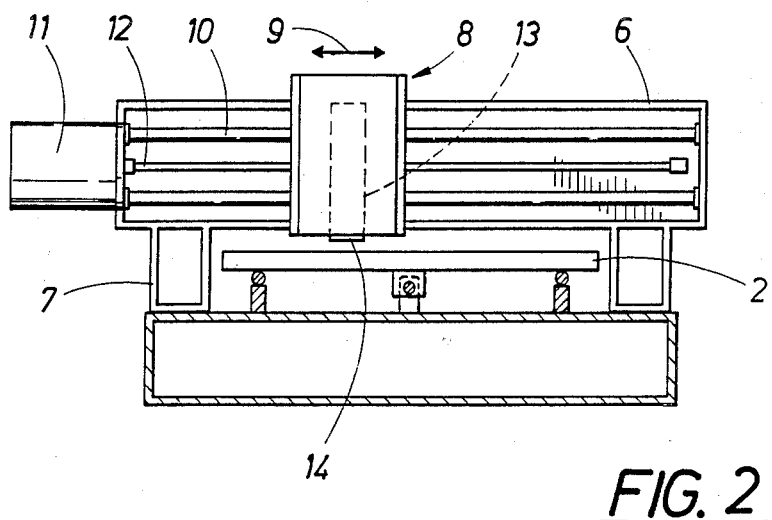
FIG. 2 is a section through the arrangement along the line II—II in FIG. 1.

It will be appreciated from FIGS. 1 and 2 that the table is able to move between the two end positions on two guides 3 in the form of rods, with the movement being achieved by means of a motor 4 so arranged as to cause a drive shaft 5, for example a threaded spindle, for the table to rotate. Mounted on the drive shaft is a carriage in the form of, for example, a nut so arranged as to convey the table in one or other direction along its two guides. The nut is thus caused to move along the spindle 5 by being prevented from rotating by its connection with the table 2. There extends over the table a bridge-like frame 6 which exhibits two legs 7 and which supports a lighting unit 8 so arranged as to move in the direction of the arrows 9. This is achieved by the lighting unit being capable of moving along two guides 10, with the movement being achieved in a similar fashion to the movement of the table 2, i.e. by means of an electric drive motor 11 so arranged as to cause a drive shaft to rotate, for example a threaded spindle 12, which interacts with a nut or a threaded part of the lighting unit 8. The lighting unit 8 contains an optical system 13 which contains a light source (not shown) and optics for refracting the beams of light emitted from the light source towards an aperture 14 present in the optical system. Its construction is described in more detail below in relation to two ilustrative embodiments.

By locally illuminating delimited areas of the light-sensitive film during the relative movement of the lighting unit over selected points on the film, it is thus possible for a pattern to be created, which, for instance, can form the basis for the manufacture of printed circuit boards for electronics applications. The control of the movements of the lighting unit 8 and the table 2, and of the functions which determine the appearance of the pattern is achieved in the form of control signals from a control unit 70 (FIG. 3) in the form of, for instance, a microcomputer. Program instructions for the microcomputer can be provided either by means of a program stored in the memory or by a control from CAD equipment, which is used to construct the desired pattern, in this case the printed circuit board. Control instructions for the various parameters can also be obtained by means of a separate control panel in combination with an alpha-numerical display unit on which the various parameters can be read. The various control alternatives may be provided on one and the same unit, and may be selected depending on the particular situation encountered.

Figure 3:
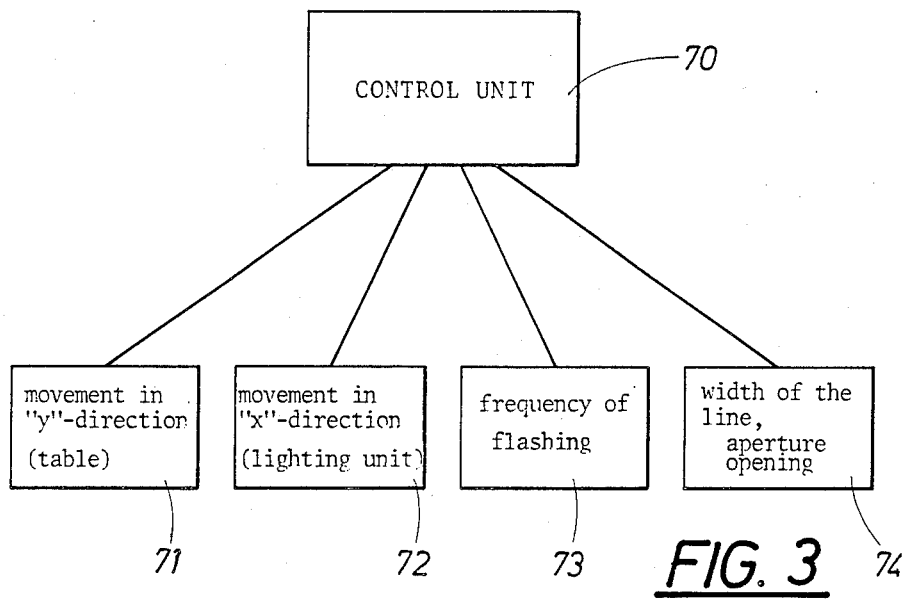
FIG. 3 shows a block diagram of an example of the principal functions of the photo-plotter.

The principle parameters may be appreciated from the block diagram in FIG. 3, where a block 71, which relates to the table, in this instance represents movement in the 'y'-direction, thus the speed and position of the table, and a second block 72 represents movement in the 'x'-direction, thus the speed and position of the lighting unit 8, a third block 73 relates to the frequency of flashing of the lighting unit, and a fourth block 74 relates to the width of the line, i.e. to the aperture opening.

The control of the position of the lighting unit 8 relative to the position of the light-sensitive film 15 is thus of the co-ordinate control type, in which each point on the light-sensitive film can be reached through the input of control information in the 'x'-direction for the lighting unit, and in the 'y'-direction for the table. The pattern is essentially in the form of lines and dots, with the lines extending either in the 'x'-direction or in the 'y'-direction, or at an angle of 45° to the 'x'-direction and the 'y'-direction. A line in the 'x'-direction is obtained by the input of control information to the lighting unit only, whilst the control information supplied to the table is equal to zero. Movement in the 'y'-direction only is achieved by the input of control information to the table 2 only, whilst the control information supplied to the lighting unit 8 is equal to zero. Movement at an angle of 45° is obtained by the simultaneous input of the same control information to both the table 2 and the lighting unit 8, i.e. the same speed of movement in a certain direction. The control information for all movements in actual fact contains not only speed information, but also directional information.

The light-sensitive film 15 is given the pre-determined pattern through the lighting unit 8 emitting a beam of light directed at right-angles to the surface of the table 2, i.e the film surface, when a spot of light 16 (see FIG. 4) will be produced on the surface of the film. The lighting unit 8 is of a type in which the beam of light directed at the surface of the film, and thus the spot of light, is not produced continuously, but intermittently in the form of flashes of light at a certain pre-determined frequency. The flashes of light are thus of very short duration at pre-determined intervals, usually 800 times per second in this particular instance, but can be varied depending on the speed of movement of the lighting unit 8 and the table 2, for instance in order to match the acceleration and retardation of these two units during starting and stopping in order to achieve uniform exposure. The intermittent flashes of light which are directed at the surface of the film can be generated by means of, for instance, a laser or a flash lamp of the xenon type, but may also be created by means of a rotating prism which projects the beam of light at the desired frequency towards the aperture 14, in conjunction with which the light source may be a continuous light source, for example an incandescent lamp.

According to the invention the aperture 14 is so arranged that the intermittently generated spots of light 16 (see FIG. 4) are in the form of polygons, in the example illustrated octagons, i.e. eight-cornered areas of light, defined by eight lateral lines or sides 17–24. The octagons 16 are isogonal, which means that the angle between each lateral line or side of the octagon is 135°. The opening of the aperture 14 and thus the spot of light 16 also coincides with two of the sides of the octagon, in actual fact the opposite sides 17, 21 which extend in the 'x'-direction and two of the other sides of the octagon, in actual fact the sides 19, 23 which extend in the 'y'-direction, whilst the remaining sides 18, 20, 22, 24 extend at an angle of 45° to the 'x'- and 'y'-directions. According to the invention the sides 17, 19, 21, 23 which extend in the 'x'- and 'y'-directions are identical in size and are equal in length to one third of the overall width a of the octagon, whilst the remaining four sides 18, 20, 22, 24 are identical in size with one another, but have a length of $a/3\sqrt{2}$, i.e. a length whose projection onto the 'x'-axis or the 'y'-axis is equal to a/3.

Figure 4:
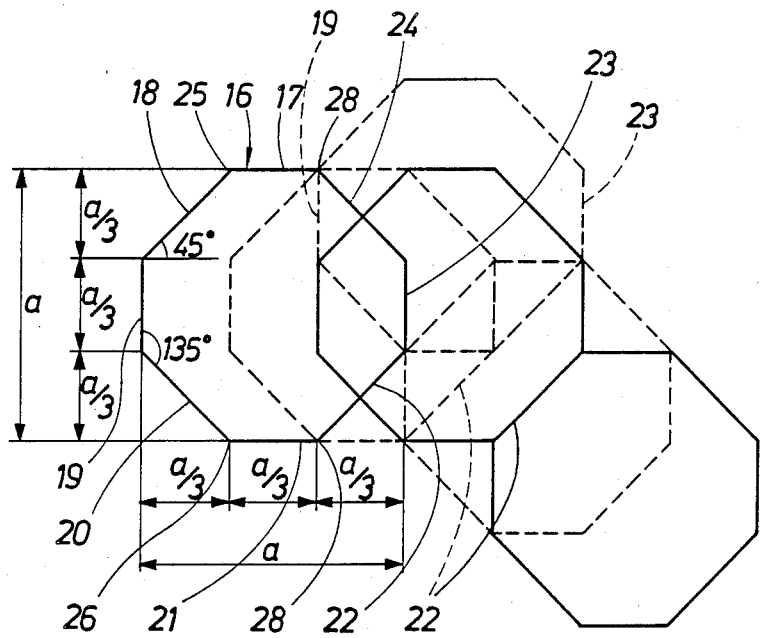
FIG. 4 illustrates the principle embodied in the invention for producing a pattern on a light-sensitive surface.

The configuration described above of the spots of light 16 in combination with the co-ordinate control system forms the basis for the simple method in accordance with the invention of creating a pattern of lines and dots such as is called for, for instance, by the printed circuits used in electronics connections. The speed of movement of the spots of light 16 over the light-sensitive film 15, i.e. the speed of movement of the lighting unit 8 and the table 2 respectively, and the frequency of flashing of the spots of light 16 are matched in such a way that a flash of light wil be produced for each movement of the lighting unit 8 relative to the film 15 over a distance of a/3 in the 'x'- and/or 'y'-direction, i.e. the length of the sides which extend in the 'x'- and 'y'-directions. This distance a/3 has been calculated beforehand and entered into the permanent program of the microcomputer as the Lowest Significant Bit (LSB). The series of octagons plotted in FIG. 4 shows how the three spots of light 16 are generated consecutively whilst moving only in the 'x'-direction, i.e. with the table 2 stationary, when the sides 17, 21 of the octagon together constitute the longitudinal edges of a line with a width which is determined by the size of the aperture opening, i.e. the width a of the flash of light. Indicated after the three spots of light with a spot of light displaced upwards by the distance a/3 in the 'y'-direction is the start of a line perpendicular to the first line and having the same width. An angle-cut outer corner of the side 22 is formed in this way, whilst the two longitudinal edges of the line are constituted by the sides 19, 23. The unbroken straight edge is achieved by the described matching of the moment of the flash to the distance covered, in such a way that the left-hand corner 25, 26 of the sides 17, 21 of the octagon in a subsequent spot of light will coincide with the right-hand corner 27, 28 of the preceding spot of light. An unbroken edge would be obtained even if the distance covered were to be slightly shorter, so that a certain amount of overlap takes place, although the distance covered may not exceed the distance a/3, which would result in a 'ragged' line. The lines which are inclined at 45° are produced by the control information being entered simultaneously and at identical values into both the lighting unit 8 and the table 2, i.e. for movement in both the 'x'-direction and the 'y'-direction, in conjunction with which the speed of movement of the lighting unit relative to the film 15 will be matched in such a way in relation to the frequency of flashing that one exposure of the film will take place for each movement in the 'x'-direction and in the 'y'-direction over the distance a/3. In the case of movements at an angle of 45°, too, the frequency of flashing is controlled by the distance covered in the 'x'-direction and the 'y'-direction, which is a/3, i.e. the same as in the case of movement in the 'x'-direction and the 'y'-direction. This irregular octagon thus permits a very simple type of control with digital control signals, because the control signals for the movement of the lighting unit and the table can be based on the same basic quantity, in this case a/3.

Figure 6:
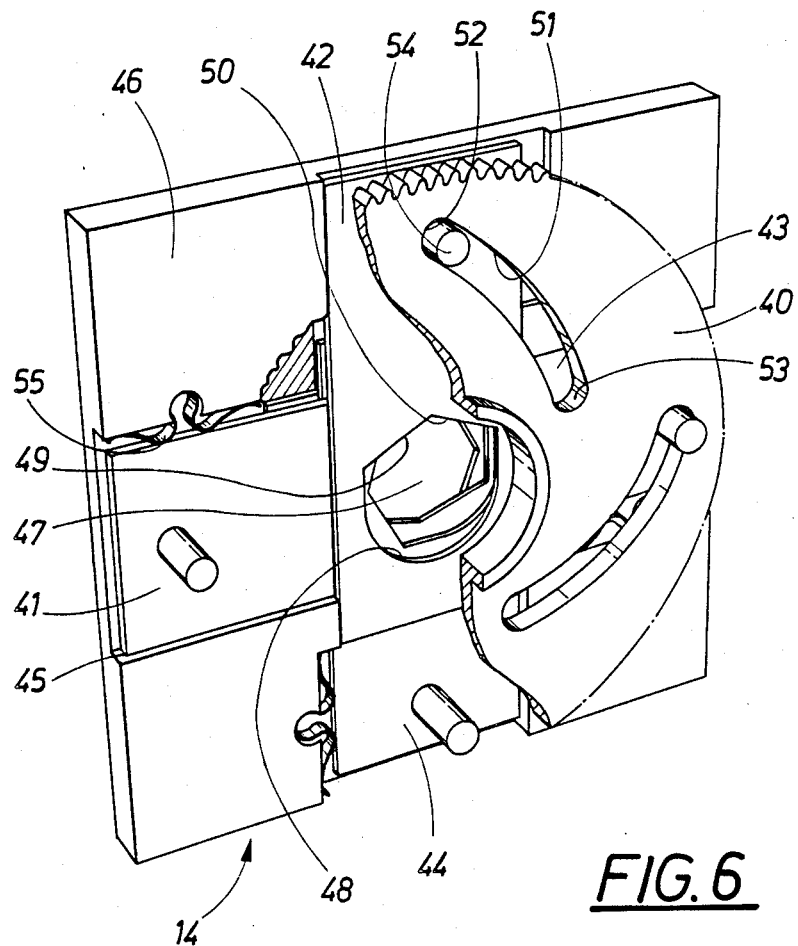
FIGS. 6 and 7 show two embodiments of apertures contained in an optical system which are used for producing the pattern on the light-sensitive surface.

The position of the octagonal spot of light in the co-ordinate system is preferably defined in terms of the co-ordinates for the centre of the octagon; see FIG. 6. For the sake of simplicity the length of a line is defined as the distance between the centres of the first and the last octagons. The positions of the lighting unit 8 and the table 2 relative to a reference point in the co-ordinate system are monitored continuously by an optical digitizer contained, in the control unit which emits pulses to a position calculator for each 5 μm covered. Its position is compared with a flash register calculator contained in the control unit with regard to the least significant bit (LSB), and when these two calculators are identical a flash will be emitted and the LSB for the next position of the lighting unit relative to the table will be entered into the flash register calculator so as to permit the emission of the subsequent flash. In this way a new flash will be emitted for each occasion on which the lighting unit or the table has been moved over a distance equal to a/3.

In order to maintain the maximum speed whilst a line is being drawn for as long as possible before retardation beings, the co-ordinates for the end point of the line are compared continuously with the position co-ordinates. Once the difference has reached a pre-determined minimum value the current to the drive motor is reduced progressively in accordance with the microcomputer program.

An example of how symbols and shapes can be created using octagons is provided in FIG. 6, which illustrates one possible approach to the creation of a square or rectangular area.

Octagons equal to ¼ of the length of side of the square or of the short side of the rectangle are plotted in a sequence which is illustrated by means of arrows in the Figure. This produces a square which is to all intents and purposes perfect, the angle-cut corners of which account for only about 8% of its length of side. The same is true of the rectangle, and in this case the percentage value relates to its short side. In the event of even smaller angle-cut corners being required for some particular purpose when using octagons, it is possible to use smaller octagons to fill out the corners.

Figure 5:
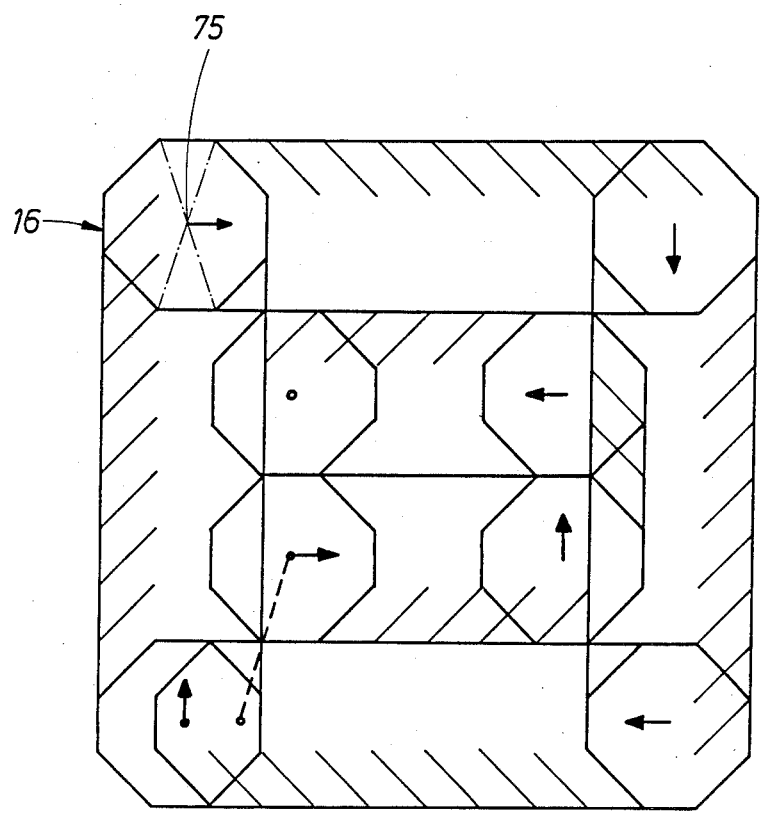
FIG. 5 illustrates the manner in which certain areas are constructed by the plotter.

The sequence begins by a movement of the spot of light upwards in FIG. 5 and continues around the lateral lines of the square so as to follow the broken line at a distance a/3 from the starting position and then to fill the remaining area as indicated by the directions of the arrows.

FIG. 6 shows an example of a first embodiment of the aperture 14 for producing the series of octagonal spots of light. The aperture device is thus so arranged as to restrict the extent of the beam of light which is enclosed by the optical unit 13 and thus determines the external contour and width of the spots of light which are produced. The aperture is powered by an electric motor (not shown) which is controlled from the control unit for the purpose of adjusting the desired line width. The aperture 14 comprises a toothed wheel 40 in mesh with a pinion (not shown) which is connected, if necessary via further pinions, to the shaft of the drive motor. The aperture also consists of four slides 41, 42, 43, 44, each of which runs in its own guide 45. These are in the form of a recess in a plate 46 which supports the aperture mechanism. Four recesses are thus so positioned as together to form a cross which is arranged symmetrically relative to the aperture opening 47. Each slide exhibits an opening 48, each of which exhibits two lateral parts 49, 50 which have a determining effect on the size of the common aperture opening 47 and thus on the size of the spot of light. Other lateral parts are positioned in such a way that they have no effect on the aperture opening. The two lateral parts 49, 50 thus exhibit a mutual angle of 135°, in which case each section of these lateral parts constitutes its own side of the octagon. The lateral parts are arranged for this purpose in a mutual position relative to one another such that the desired irregular octagon is produced, i.e. under the conditions illustrated in FIG. 4. Because the four slides 41, 42, 43, 44 can be imparted with uniform linear movement in a direction respectively towards and away from one another, it is possible to create an aperture opening 47 which varies in size, but which at all times remains uniform. This is achieved by the toothed wheel 40 exhibiting curved and uniformly extending guide slots 51, which extend from a radially outer position at one end to a radially inner position at the other end 53. There extends into each of the slots a guide pin 54 attached to each of the slides, which means that the guide pin and the slides are caused to execute a movement in a radial sense relative to the toothed wheel 40 in such a way as to cause the aperture opening 47 to be varied. The reference designation 55 is used to denote a spring which is fitted in each recess 45 in order to ensure high accuracy of the position of each slide.

Figure 7:
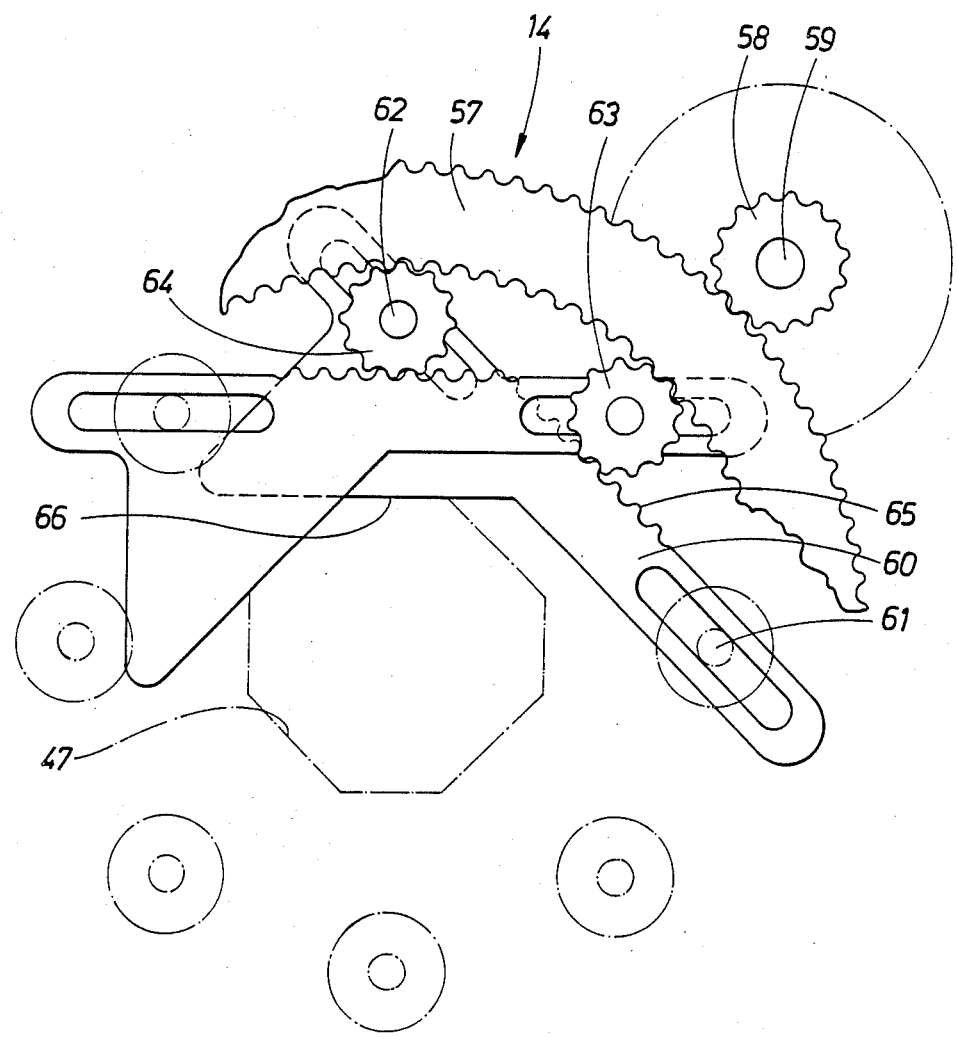

FIG. 7 illustrates entirely in schematic form an alternative embodiment of the aperture arrangement 14, in which an annular toothed wheel 57 is powered by a toothed pinion 58 on the shaft 59 of an electric drive motor. In both embodiments the drive motor is appropriately in the form of a stepping motor, preferably with digital control, in which case a certain control signal to the control motor will produce a certain opening of the aperture without the need for complicated control equipment. The aperture opening is determined in this case by eight slides 60 which are supported by guide pins 61, two for each slide. These guide pins also constitute shafts on which rotate the toothed pinions 63, 64 which interact with a toothed rack section 65 on each slide. In this case only one side of each slide is defined by an edge section 66 on the slide. This edge section 66 is so positioned in relation to the direction of movement of the slides and the centre of the aperture opening 47 that the edge section is displaced with regard to its distance in a direction perpendicular to the normal of the aforementioned centre. The relative positions of the edge sections are so arranged that the different lengths of the sides of the octagon are produced. The edge section 66 thus exhibits a pre-determined angle, more precisely 135°, to the direction of movement of the slide. It must be pointed out that only two of the eight slides 60 are shown in the Figure in the interests of clarity. The other slides are similarly positioned, are supported by other pins, and are driven by appropriate toothed pinions 63.

Figure 8:
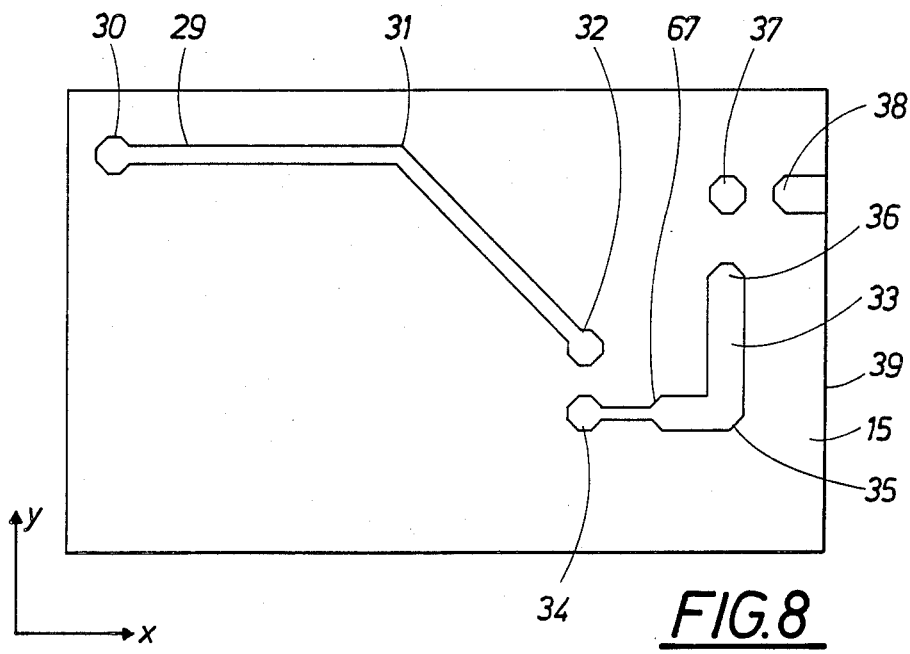
FIG. 8 shows an example of a type of pattern, in this case a printed circuit board for an electronics application.

Shown in FIG. 8 is an example of a number of simple lines which have been produced by the exposure of the light-sensitive film and which have subsequently been utilized in order to produce in a conventional manner printed circuits on printed circuit boards. In this case the exposed film is used after it has been developed for further processing, in which the exposed pattern is transferred to, for instance, a copper laminate on an epoxy plate, said copper laminate being removed by etching at all points except those at which the pattern has been produced, in this way providing the conductors required for the electronic components which will be installed one by one after the conductors have been drilled through at pre-determined points. The conductor 29 is first provided with an enlarged end point 30 by controlling the aperture to the desired size after the co-ordinates for this point have been found. This will cause a flash of light to be generated, which, once it has moved over a distance a/3, will have been reduced to a smaller width, i.e. a reduction of the distance a during movement only in the 'x'-direction during successive flashes for each movement over a distance a/3 as far as the point of deflection 31. At this point control information is supplied to the table for movement in the 'y'-direction during continued movement in the 'x'-direction, in which case the inclined section is formed with an unchanged width, in conjunction with which instructions are given prior to the final flash of light for a larger aperture opening to be provided in order to form the end point 32. The conductor 33 is produced in a similar fashion by finding the end point 34, by setting the aperture opening to the desired size, and by emitting a flash of light, whereupon the aperture opening is reduced during successive movement in the 'x'-direction at a considerably reduced aperture opening, which is increased steeply at 67 to a relatively large opening to produce a large line width. In order to arrive at a pre-determined co-ordinate, control instructions are given for movement in the 'y'-direction only as far as an end point 36, where the light source is extinguished or shielded. The co-ordinate for the point 37 is then searched for, at which a flash of light produces a spot of light of the selected size. Control information is then supplied to the lighting unit in order to produce movement in the 'x'-direction to the point 38, where flashes of light are emitted as a series whilst movement in the 'x'-direction continues as far as the edge 39 of the film. The film continues to be marked in a similar fashion with the lines and dots which are required as the basis for the particular pattern. These lines are not shown, however, in the interests of clarity. Alternatively, the pattern may be generated by the technique known as raster scanning, which is similar to the technique for the construction of, for instance, a television picture, in which the lighting unit follows a parallel pattern of lines in the 'x'-direction whilst moving in the 'y'-direction once each line has been filled, said movement taking place over the distance a/3 concerned in the 'y'-direction during control of the flashes of light in such a way that the light source is extinguished or screened above those areas at which exposure is not to take place.

The invention is not restricted to the illustrative embodiment referred to above and described in the drawings, but may be modified in a number of ways within the scope of the following Patent Claims. It is conceivable, for instance, to select a regular octagon, with an increasing overlap of the spots of light relative to one another as a consequence. It may also be possible to utilize other polygons which have opposite sides which are parallel to one another and other sides which can be used for lines situated at an angle to the lines extending in the 'x'-direction and the 'y'-direction. The expression 'light' is intended to denote in this context not only visible light; the beam of light may also contain other high-frequency wave motion in the form of light outside the visible frequency range.

We claim:

1. An arrangement for producing a pattern on a light-sensitive surface (15) by means of a spot of light (16) capable of being moved over the surface generated by means of a beam of light emitted by a lighintg unit (8), which is directed at the light-sensitive surface and is caused to strike the surface intermittently in the form of flashes of light as the beam of light is moved over the surface in accordance with specific instructions from a control unit (70), for which purpose the pattern is made up of lines (29, 33) running not only in a selected reference direction, but also at right-angles to the selected reference direction, and also at at least one further fixed angle to the reference direction, in conjunction with which the lighting unit contains an aperture (14) by means of which certain dimensions of the pattern, such as the width of the aforementioned line, can be set, characterized in that the aperture (14) is so arranged as to produce the aforementioned spot of light (16) on the light-sensitive surface (15) in the form of an isogonal polygon having at least six sides and with a first pair of sides (17, 21) which lie opposite one another and are essentially parallel to one another, and a second pair of sides (19, 23) which lie opposite one another, are essentially parallel to one another and are essentially perpendicular to the first-mentioned pair, and at least a third pair of sides (18, 20, 22, 24) which lie opposite one another, are parallel to one another and lie at an angle to the first-mentioned pair of sides at the aforementioned fixed angle, in conjunction with which the beam of light is so arranged as to move for each flash of light over a distance which is not more than the length of each of the sides which extend in the direction of movement.

2. An arrangement according to patent claim 1, characterized in that the aforementioned polygon is in the form of an octagon.

3. An arrangement according to patent claim 1, characterized in that the octagon is irregular, in which case the first-mentioned two pairs of sides (17, 19, 21, 23) exhibit a length which is one third of the width (a) of the octagon, and the remaining pairs of opposite sides (18, 20, 22, 24) exhibit a length of which the projection onto the prolongation of the first-mentioned pair of sides is the same as their length.

4. An arrangement according to any of the preceding patent claims, characterized in that the movement of the beam of light over the light-sensitive surface is detected, and in that the light unit (8) is controlled in such a way that a flash of light is emitted for each completed distance which is the same as the length of each of the sides of the octagon (46) which extend in the direction of movement.

* * * * *